United States Patent
Kari et al.

(10) Patent No.: US 7,363,385 B1
(45) Date of Patent: Apr. 22, 2008

(54) ROUTING OF DATA TRANSMISSION CONNECTION

(75) Inventors: Hannu H. Kari, Veikkola (FI); Juha-Pekka Ahopelto, Lapua (FI)

(73) Assignee: Nokia Corporation, Espoo (FI)

( * ) Notice: Subject to any disclaimer, the term of this patent is extended or adjusted under 35 U.S.C. 154(b) by 481 days.

(21) Appl. No.: 09/623,928

(22) Filed: Sep. 8, 2000

Related U.S. Application Data

(63) Continuation of application No. PCT/FI99/00174, filed on Mar. 5, 1999.

(30) Foreign Application Priority Data

Mar. 9, 1998 (FI) ..................................... 980537

(51) Int. Cl.
*G06F 15/173* (2006.01)
*G06F 1/12* (2006.01)

(52) U.S. Cl. ..................... 709/238; 709/227; 709/250

(58) Field of Classification Search ............... 709/230, 709/240–242, 217–219, 238, 239, 227, 250; 370/237–238.1; 455/450–453
See application file for complete search history.

(56) References Cited

U.S. PATENT DOCUMENTS

| | | | |
|---|---|---|---|
| 5,726,984 A | | 3/1998 | Kubler et al. |
| 5,825,772 A * | | 10/1998 | Dobbins et al. ............. 370/396 |
| 5,838,663 A * | | 11/1998 | Elwalid et al. ............. 370/233 |
| 6,122,514 A * | | 9/2000 | Spaur et al. ................ 455/448 |
| 6,611,547 B1 * | | 8/2003 | Rauhala ....................... 370/331 |
| 6,804,312 B1 * | | 10/2004 | Win et al. .................... 375/347 |
| 6,952,588 B1 * | | 10/2005 | Igarashi ....................... 455/463 |

FOREIGN PATENT DOCUMENTS

| | | |
|---|---|---|
| EP | 0 781 005 | 6/1997 |
| EP | 0 841 772 | 5/1998 |
| WO | 97/31495 | 8/1997 |
| WO | 97/39595 | 10/1997 |

OTHER PUBLICATIONS

Computer Dictionary Online, p. 1-3, terms Cellular Digital Packet Data (CDPD), Global System for Mobile Communications (GSM), and Frequency Modulation (FM).*
Linktionary, Networking Defined and Hyperlinked, Sheldon T., p. 1-2, term Satellite communication systems.*

(Continued)

*Primary Examiner*—Zarni Maung
(74) *Attorney, Agent, or Firm*—Squire, Sanders & Dempsey

(57) ABSTRACT

A problem with known data transmission networks is that the connection of the terminal equipment to the data transmission network is not flexible. The user must himself actively perform the choice and connection of access as well as its registration with the network nodal point. The invention concerns a method and an arrangement for routing a data transmission connection between terminal equipment (TE) and a host over a data transmission network, which network includes at least two access points (R1, R2, R3) for connecting the terminal equipment to the data transmission network. The method is characterized in that at least one criterion is established for the choice of access point, the access points are estimated according to said criteria, at least one access point meeting the criteria is chosen, and the data transmission traffic is connected through the chosen at least one access point.

32 Claims, 5 Drawing Sheets

OTHER PUBLICATIONS

Computer Dictionary Online, p. 1-3, terms Cellular Digital Packet Data (CDPD), Global Sytem for Mobile Communications (GSM), and Frequency Modulation (FM), Dec. 5, 1994.*

Linktionary, Networking Defined and Hyperlinked, Sheldon T., p. 1-2, term Satellite communication systems. (Jan. 2001).*

International Search Report for PCT/FI99/00174, Aug. 23, 1999.

* cited by examiner

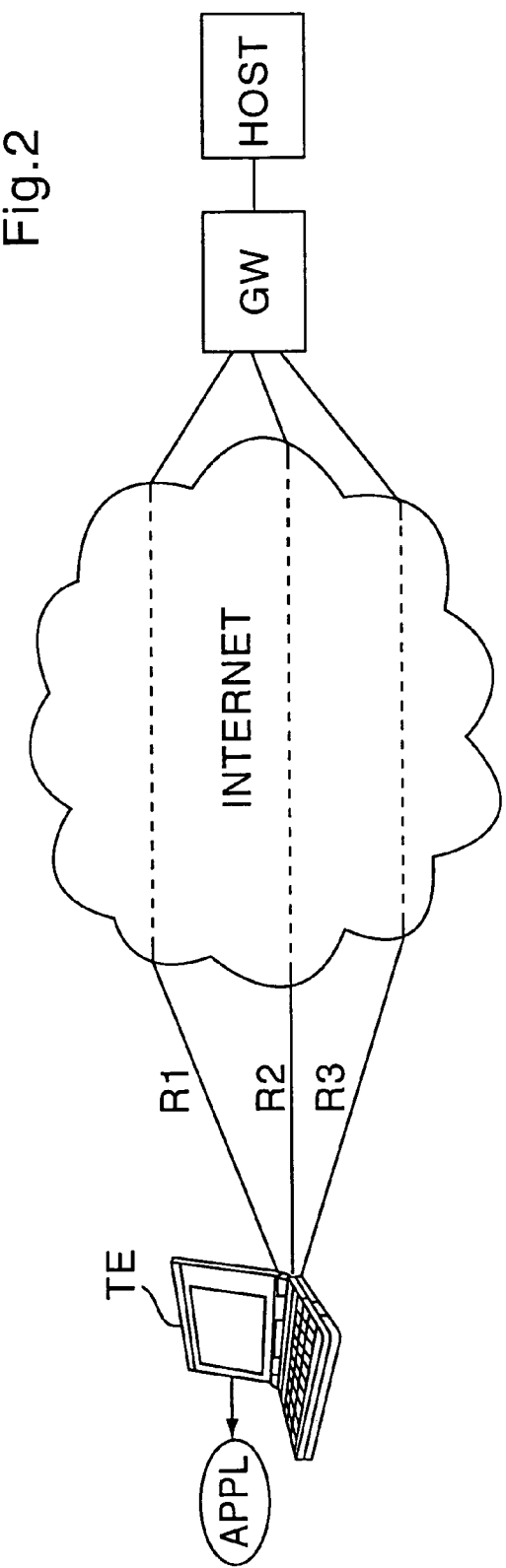
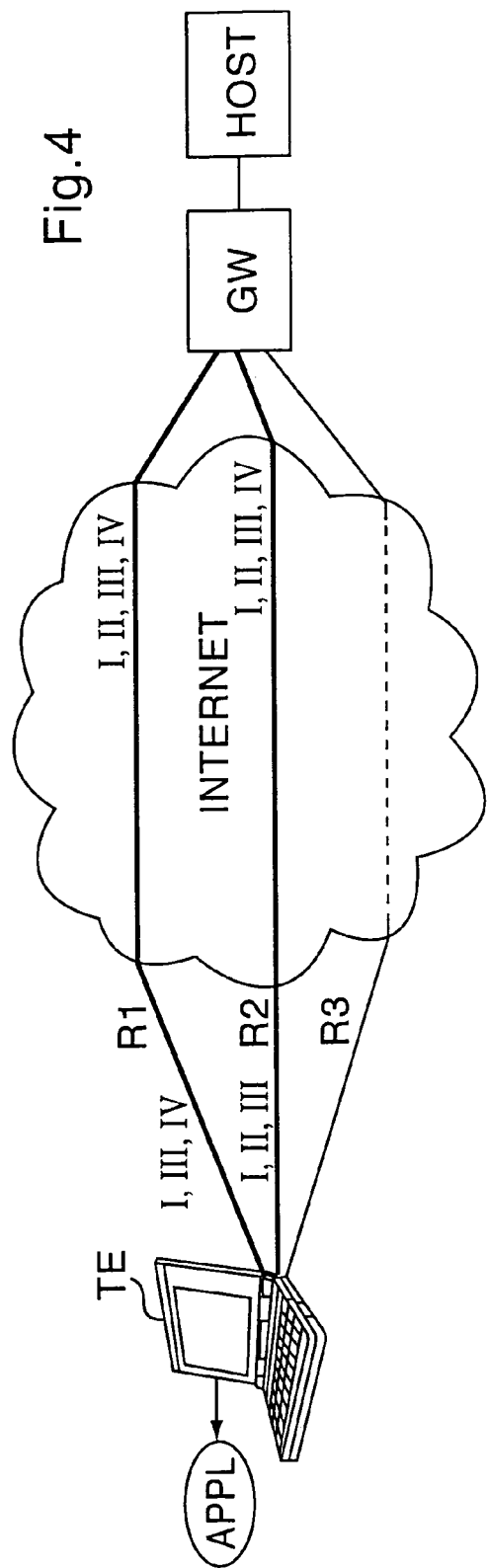

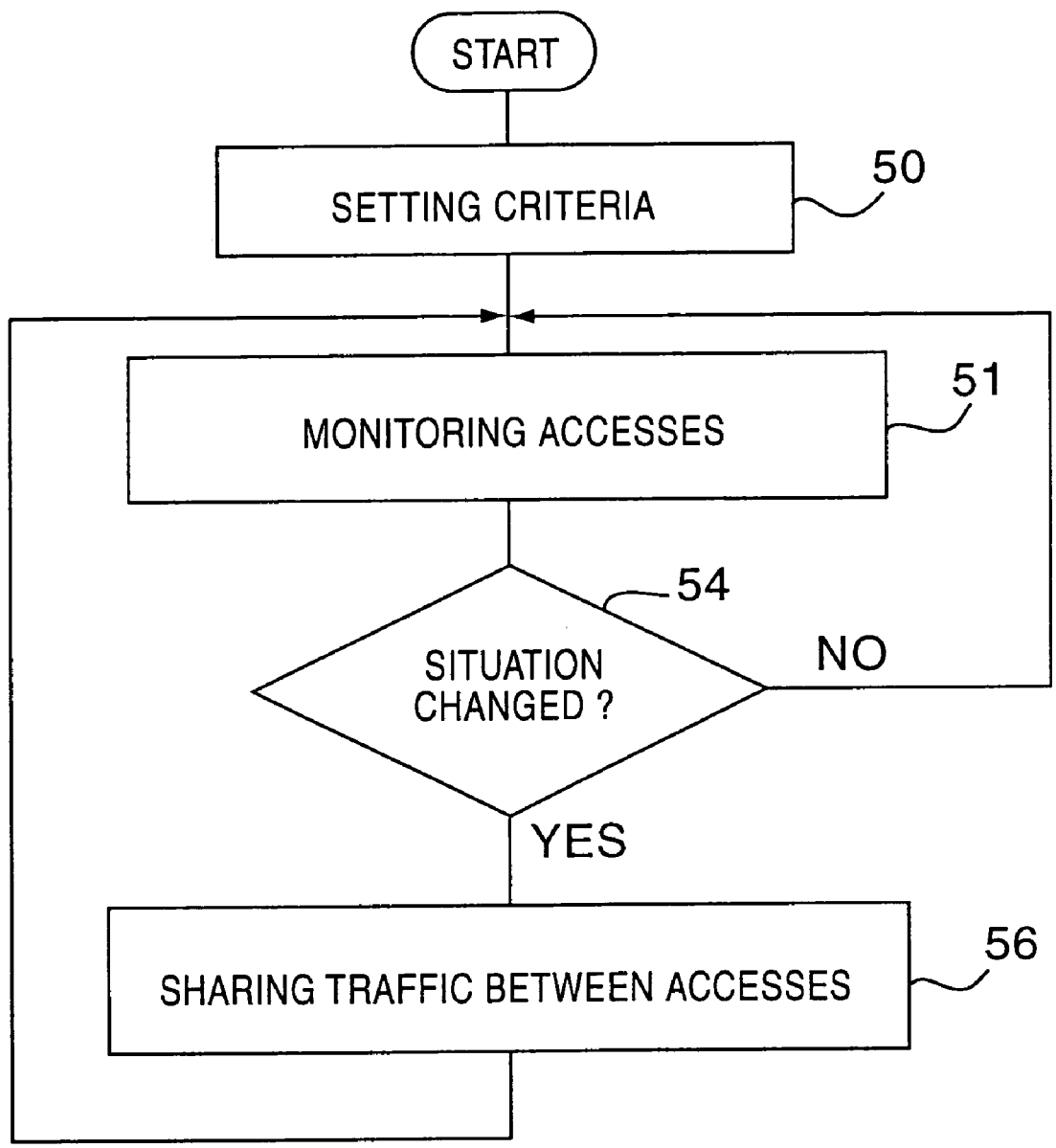

ROUTING OF DATA TRANSMISSION CONNECTION

This application is a continuation of international application Ser. No. PCT/FI99/00174, filed 5 Mar. 1999.

FIELD OF THE INVENTION

The invention concerns routing of a data transmission connection between a piece of terminal equipment and a host over a data transmission network.

TECHNICAL BACKGROUND

Mobile use of various personal computers, e.g. PDA (Personal Digital Assistant) and intelligent telephones, has become increasingly popular. Using such terminal equipment the user is in connection with the host, both in the office and outside the office. Some modern user interfaces for terminal equipment, such as Windows 95, allow connection and disconnection of so-called plug-and-play accesses even while the application is running.

It is known in the state of the art to choose the routing at nodal points of a network. FIG. 1 in the appended drawing shows how a piece of terminal equipment is connected through an intermediary network (internet) to a host in a known manner. E.g. when moving outside the office in situation 1, terminal equipment TE connects with the AP1 (Access Point). In the messages which it sends, the terminal equipment uses as source address the address reserved by the access point for the terminal equipment. A node wishing to be in connection with the terminal equipment will for its part use said address as destination address for messages which it sends. When the access point is changed, this address will be exchanged, e.g. in the situation 2 shown in FIG. 1 for the address reserved by access point AP2. By using e.g. the Mobile IP protocol, the access point used currently by the user may be registered in the HA (home agent), which allows use of the same address irrespective of the access point. However, the user must choose manually the access point to be used at each time. It is not possible in this arrangement to exchange the access point automatically for another access point while terminal equipment TE is moving, e.g. to replace AP1 with AP2, but the terminal equipment must itself actively connect and register with a new access point in order to bring about the connection. The user can be connected with one access point at a time.

The connection from terminal equipment TE is set up using the available access. Various network accesses are e.g. the Ethernet or IR (infra-red) at the office or the GSM (Global System for Mobile Communications) data access, especially the GPRS (General Packet Radio Service) access, outside the office. One generally used way of access is by connecting a PCMCIA access card to terminal equipment TE. The user may remove and connect these accesses as he desires, whereby the connection is set up by way of the access which is connected at each time. Several cards may also be connected at the same time to terminal equipment TE, but hereby only one of them is used, e.g. the access which was connected first to the terminal equipment, and the access is not exchanged automatically for another while the connection is in use, even if the connection through the used access is lost.

It is a problem with state-of-the-art accesses that the connection of the terminal equipment with the data network is not flexible. The user must himself actively carry out the choice of the access to be used as well as its connection and registration with the network nodal point. In addition, when exchanging the access it is sometimes necessary to close the application and to restart the system in order to begin using a new access.

SUMMARY OF THE INVENTION

An objective of this invention is to bring about a flexible system using different network accesses and a method for routing a data transmission connection between the terminal equipment and the host.

This new type of routing a data transmission connection is achieved by methods according to the invention which are characterised by what is said in independent claims 1 and 15. Preferable embodiments of the methods are presented in the dependent claims.

In addition, the invention concerns arrangements, which according to the invention are characterised by what is said in independent claims 26, 28 and 30.

The invention is based on the idea that the first routing of the connection between the terminal equipment and the host is carried out in the terminal equipment and/or in a gateway exchange located between the terminal equipment and the host, according to criteria established in advance. In a first alternative embodiment of the invention, a router located in the terminal equipment monitors the access points currently available according to pre-established criteria for the routing of the data transmission. Based on the results of this monitoring, the router of the terminal equipment will route the data transmission traffic by way of at least one access point meeting the criteria in the desired manner. According to the criteria set up in the different embodiments, the router of the terminal equipment selects at least one routing alternative from at least two different access points and/or divides the traffic proportioned between at least two access points. The terminal equipment connects the chosen access/the chosen accesses with the application of the terminal equipment, preferably transparently from the viewpoint of the application and the user. Of the routing alternatives one may also choose more than one access for connection to the application simultaneously, whereby the data transmission will take place through several transmission connections, e.g. in order to ensure the data transmission. Criteria established in advance are e.g. the transmission capacity, transmission delays, transmission errors, data security and/or the costs of data transmission. The application may also set up these criteria. In the other alternative embodiments of the invention, the first routing is performed to the terminal equipment according to pre-established criteria in the terminal equipment and in the gateway exchange or only in the gateway exchange.

It is an advantage of such a method that it allows to choose the access which is most advantageous for the user, e.g. the cheapest access or one which gives the best performance.

It is another advantage of the method according to the invention that change of the access and use of accesses can be carried out in a manner which is transparent to the user and/or the application, keeping up an essentially continuous connection. No changes need be made in existing connecting methods.

It is also an advantage of the method according to the invention that it allows data security for the data transmission connection from one end to the other as well as data compression when required.

It is an advantage of the arrangement according to the invention that it does not require any special application or any changes to state-of-the-art applications, but it can be used when using existing applications. Nor need any changes be made in existing access points or in the transmission network.

BRIEF DESCRIPTION OF THE DRAWINGS

The invention will now be described in greater detail in connection with preferable embodiments and referring to the examples shown in FIGS. 2-6 of the appended drawings, wherein:

FIG. 2 shows a connection of a piece of terminal equipment to a host over a data transmission network in accordance with the invention;

FIG. 4 shows a case by way of example of a primary embodiment of the invention wherein data packages are relayed through network access points in accordance with the invention;

FIG. 5 is a flow chart of a secondary embodiment of the method according to the invention.

DETAILED DESCRIPTION OF THE INVENTION

The present invention may be applied in connection with any data transmission system. The invention will be described in greater detail hereinafter in the light of preferable embodiments and referring to the figures in the appended drawings. As used in this application, access point refers to a general connection point in a data transmission network to which the terminal equipment may connect itself in order to set up an access to the data transmission network.

FIG. 2 shows the structure of an access network in accordance with the invention. The figure shows three alternative routes R1, R2 and R3 from terminal equipment TE to a host by way of an intermediary internet network and gateway exchange GW. According to the invention, one can hereby choose between several alternative routes, in the case shown in FIG. 2 there are three routes, of which at least one access at a time is chosen for use by the terminal equipment. The accesses connected to the terminal equipment may be e.g. Ethernet, IR and GSM data accesses. In the terminal equipment an APPL application is running, for the use of which the access is chosen. When required, the traffic between the terminal equipment and the host may be compressed and/or encrypted.

Figure 1:
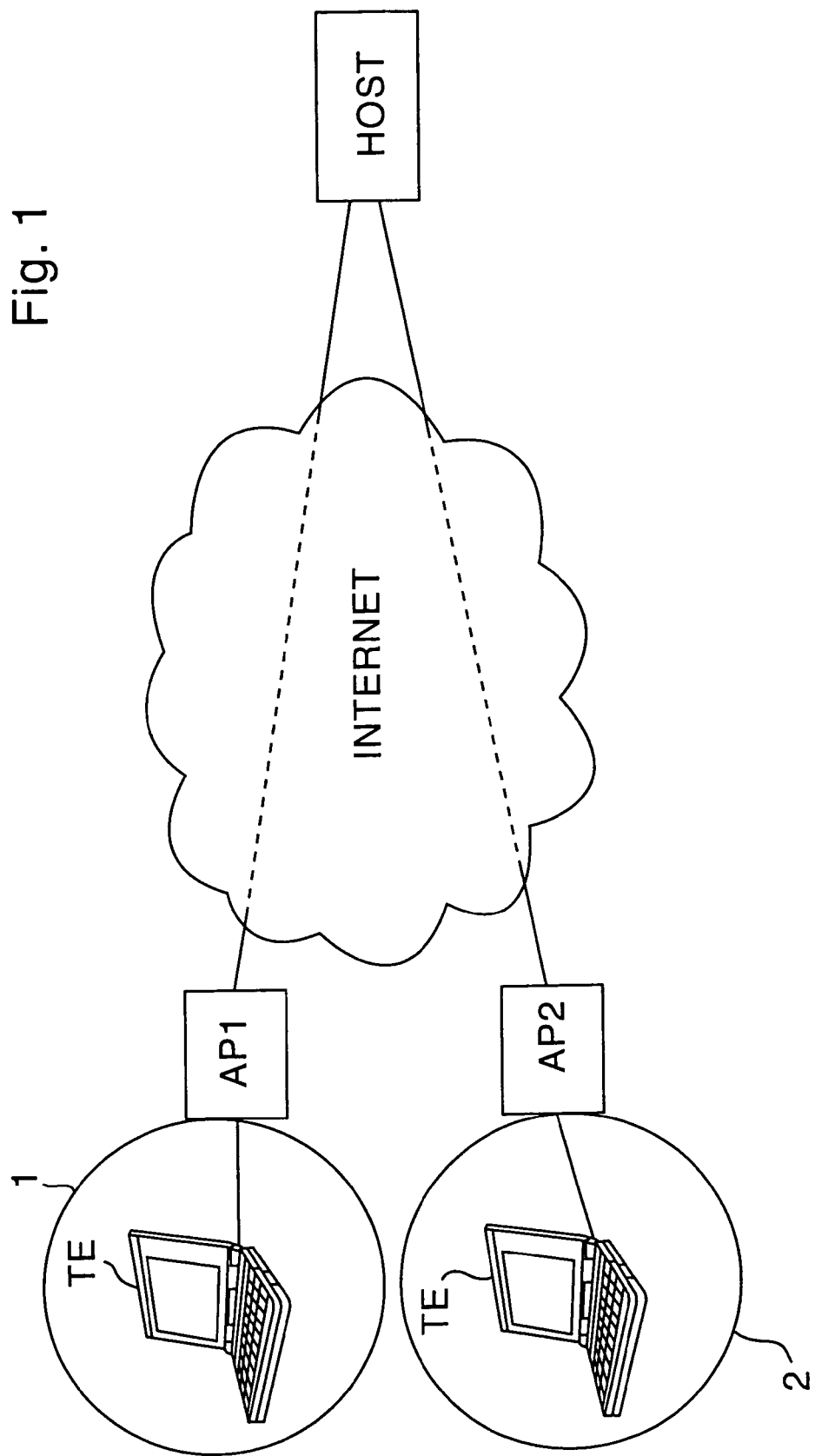
FIG. 1 shows a state-of-the-art connection of a piece of terminal equipment to a host over a data transmission network.
Figure 3:
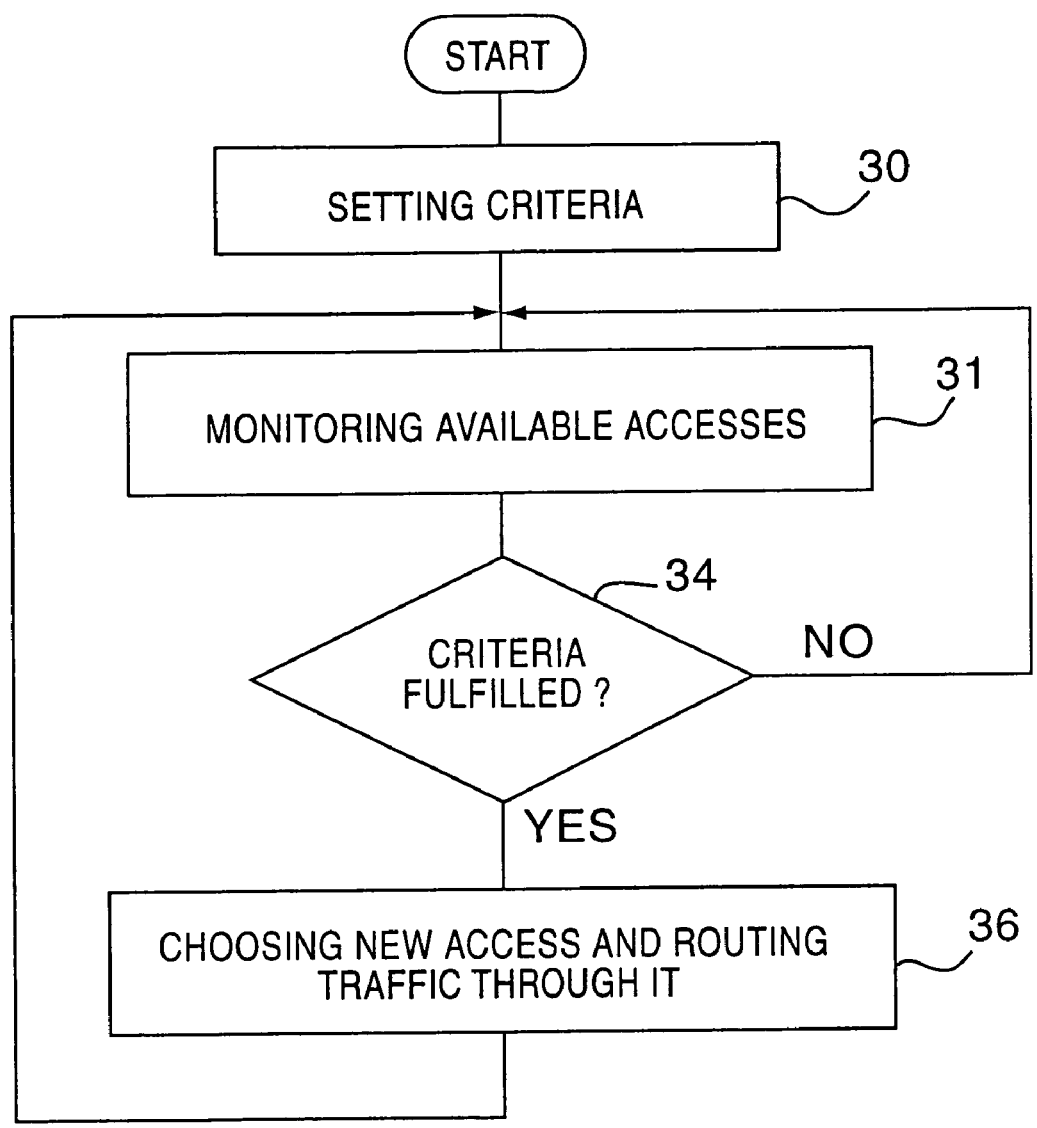
FIG. 3 is a flow chart of a primary embodiment of the invention.

In the following, the invention will be described in greater detail in the light of a primary embodiment of the invention and referring to FIG. 3, which is a flow chart of a primary embodiment of the method according to the invention. At point 30 in FIG. 3 at least one criterion is established for the choice of access. At point 31 the available accesses are monitored with the aid of their pre-established criteria according to the invention. This monitoring may be performed e.g. by monitoring each available access constantly or at certain intervals of time. At point 34 a check is made on whether the pre-established criteria have been met. There may be one criterion or more criteria at the same time, whereby in the case of several criteria the choice requires that all established criteria are met. Removal from use of a current access may be such a criterion which will trigger off an exchange of access. The check on criteria at point 34 may also be carried out by monitoring the quality of data transmission. After the condition 34 is fulfilled, a choice is made at point 36 of the access indicated by the criteria, and hereafter the traffic will be routed through this new access.

In a primary embodiment of the method according to the invention it is also possible to choose more than one access for connection at the same time between the terminal equipment and the host. FIG. 4 shows by way of example a network structure wherein data is transmitted along at least two different routes between terminal equipment TE and the host. In FIG. 4 a gateway exchange transmits to terminal equipment TE the data packages which it has received from the host both along route R1 and along route R2. Gateway exchange GW may number the data packages before the transmission, as the marks indicate in FIG. 4. Due to transmission errors, terminal equipment TE in the example shown in FIG. 4 receives through access R1 numbered packages I,III,IV and through access R2 packages I,II,III. By combining these packages received along different routes terminal equipment TE receives the entire transmitted series of packages. Owing to the numbering of the data packages, terminal equipment TE is able to screen away redundant packages, in the case shown in FIG. 4 second packages I and III, which are thus received both through access R1 and through access R2. The numbering of packages also makes it possible to determine the characteristics of the different accesses by comparing the numbering of packages received through these different accesses. In FIG. 4 access R3 is a standby access and this access point is monitored in accordance with the invention with the aid of the access choice criteria, as was described above in connection with the primary embodiment of the invention. Should terminal equipment TE in the case shown in FIG. 4 decide to change the access to access point R3, terminal equipment TE after its change of access point may inform the network what number the data package must have which is to be sent next. Gateway exchange GW need not necessarily send all data packages along each available route.

According to the functionality of the primary embodiment of the invention, the terminal equipment may first be connected to the host by an Ethernet access (R1), whereby the data is routed through this access. When the user removes the Ethernet access card, a message of this is relayed to the terminal equipments router, which according to the invention will look for a new alternative route, on which the operation can be continued. Any data packages arriving for transmission while a new route is being sought are placed in a queue to wait, until a new route is found. The search for a new route may also be carried out beforehand while the connection in use is still working. When a new route is found, e.g. an IR access (R2), the operation is continued through the IR access, until it is time for the IR access to be abolished. The router again receives information on the removal of the access and it will seek a new access to carry on the operation. When the user connects to a GSM data service, the router will route the data transmission by way of the GSM data access (R3). In the routing example according to the invention described above, the transmission connection is essentially formed by a continuous network access, which may be momentarily disconnected only during the time when a new route is sought and connected for use.

FIG. 5 is a flow chart of a secondary embodiment of the method according to the invention. In the secondary embodiment of the invention, the traffic is divided between at least two accesses according to pre-established criteria. At point 50 at least one criterion is established for the choice of transmission capacity of the access. At point 51 a check is made of the available accesses with the aid of these pre-established criteria according to the invention. This check may be carried out e.g. by monitoring each available access constantly or at certain intervals. At point 54 a check is made of whether the situation of the accesses has changed from the viewpoint of the criteria. A criterion triggering off a new division of the traffic may be e.g. such a change of the transmission capacity available in the access that it exceeds or falls short of a certain value or several different values. The check of criteria at point 54 may also be carried out by monitoring the quality of the data transmission. After the condition 54 is fulfilled, the traffic is divided at point 56 between the accesses in the proportion indicated by the result of the criteria check, e.g. so that a certain part of the traffic is relayed through one access and the remaining traffic through another access.

The primary and secondary embodiment of the invention which were described above can also be combined, whereby a choice of at least two accesses at a time is performed in the router in accordance with the primary embodiment of the invention, while the division of traffic between the chosen accesses is performed in accordance with the secondary embodiment of the invention. Hereby the criteria for the choice of access and the criteria for division of the traffic between accesses may be criteria which are separate from one another.

As criteria mentioned above one may establish e.g. the costs of data transmission, so that a certain access is chosen, e.g. a GPRS access, or as much as possible of the traffic is always transmitted in this access when no such access is available where the operation would be cheaper, such as e.g. Ethernet. Other criteria may be e.g. the transmission capacity, transmission delays, data security or transmission errors, whereby the criterion is fulfilled e.g. when some other access is better than the access in use as regards the established criterion or it is found that the access in use is poor according to one criterion. Hereby such an access may be chosen as the new access which fulfils the second criterion, or the relaying of traffic can be moved more to the access fulfilling the second criterion. The transmission capacity criterion can be used for choosing and putting into use a new access point e.g. when a new application starts up and sets up a connection requiring more transmission capacity. Several criteria of choice may be established at the same time, e.g. any combination of the criteria of choice mentioned above. The criteria of choice are preferably established so that the traffic can be directed to the new access before the transmission capacity of the old access is removed.

In a third embodiment of the invention, at least some of the access choice criteria are learning criteria, which are established in accordance with the user's repeating activity. Hereby the criteria of choice are e.g. the time and/or the place, where the terminal equipment is connected to the first access point. If the terminal equipment moves repeatedly along the same geographical route, it is possible to foresee the need to change access point and to connect the new access point in advance to operate with the terminal equipment. Hereby e.g. in a situation of access change the terminal equipment is in connection through at least two access points at the same time, whereupon the traffic through the first access can be stopped. In other respects the functionality of the third embodiment of the method according to the invention is similar to the functionality of any embodiment described earlier.

The applications to use make demands on the access to use, e.g. as regards the transmission capacity and/or transmission errors. Hereby the criteria may be changed according to the requirements of the applications so that they suit the existing situation. On the other hand, the characteristics of the chosen access point may provide the applications with possibilities e.g. for starting new functions. The functionality according to the invention can be implemented fully transparently from the viewpoint of the application used and from the user's viewpoint or also in such a way that the chosen access point/points and the possibilities provided by the chosen access points are reported to the application to be used and/or to the user, so that the application or the user may when he so desires utilise the new possibilities provided by the access/accesses and/or adapt his operation so that it suits the access. The demands made by the application on the data transmission can be determined from the protocol used by the application or from the QoS (Quality of Service) parameters established by the application, which define certain demands made on the data transmission, or by providing the application with an interface, through which the application may establish any routing criterion presented herein. By reporting to the application the transmission capacity information of the access in use it is possible to perform such a gradation of the various functions of the application that the transmission capacity in use at each time is sufficient to ensure a normal operation of the application. E.g. transmission of e-mail from the application may be delayed until there is sufficient transmission capacity available for transmitting both the other traffic and e-mail messages. When desired, the application may also be given reports on the characteristics of alternative available routes, e.g. on the transmission capacity, so that the application is aware of any available additional transmission capacity, which its functionality may require later.

In a first alternative embodiment of the invention, the router is located in terminal equipment TE, which may move from one place to another and connect to the data transmission network when required. For terminal equipment TE to connect to access points of the data transmission network no new additional functions are needed at the access points or in the access protocols compared with the state of the art.

Figure 6:
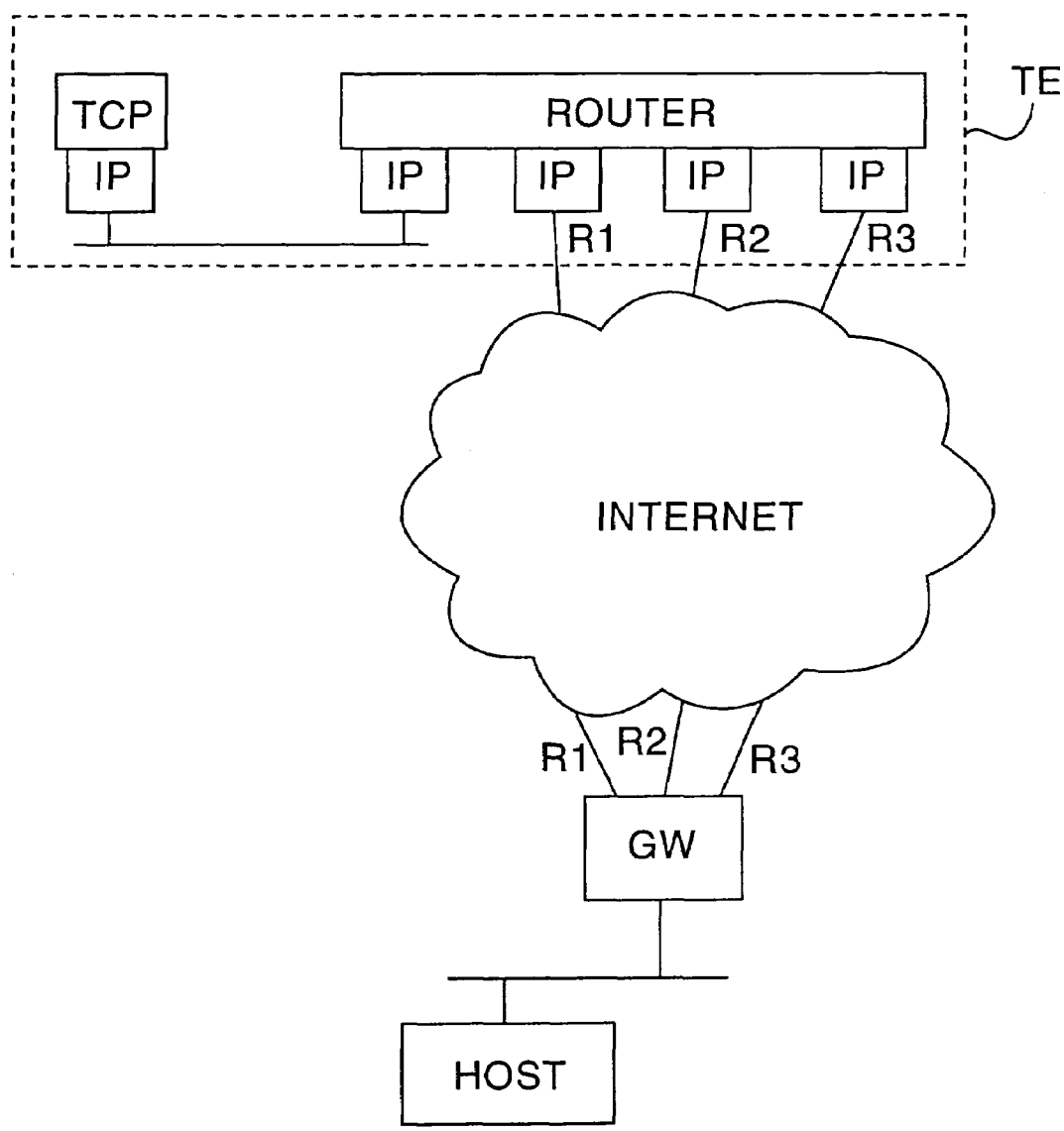
FIG. 6 shows the structure of a piece of terminal equipment according to the invention at protocol level.

FIG. 6 shows the structure of terminal equipment TE according to the invention at protocol level. When the Internet network relays data between the host and terminal equipment TE, the terminal equipment uses TCP/IP protocols in the manner shown by the figure. The router joins the other functionality by way of the IP protocol. The user's data packages may be capsulated between the router of terminal equipment TE and gateway exchange GW using some state-of-the-art method, such as e.g. Mobile IP.

In a second alternative embodiment of the invention, the router is located both in terminal equipment TE and in gateway exchange GW. Both these routers independently implement the functionality of the invention in accordance with some embodiment described in the foregoing.

In a third alternative embodiment of the invention, the router is located in gateway exchange GW, which routes the data transmission to the terminal equipment at least by way of one access according to criteria established in advance.

The functionality according to the invention may of course be used also if the data transmission network does not include any intermediary network and gateway exchange, but the terminal equipment is connected directly to the host through at least two access points.

The drawings and the description relating to them are only intended to illustrate the inventive idea. As regards its details the functionality according to the invention may vary within the scope of the claims. The invention is especially suitable for use in transmission in the form of packages, e.g. in connection with a GPRS network, but also in data transmission of some other kind. The invention is not limited to use only in connection with the access points described above.

The invention claimed is:

1. A method for routing a data transmission connection between terminal equipment and a host over a data transmission network, wherein a data transmission network includes at least two access points for connection of the terminal equipment to the data transmission network, the method comprising:
   establishing a criterion for a choice of an access point;
   evaluating access points according to said criterion;
   choosing at least two of the access points which meet said criterion; and
   connecting data transmission traffic simultaneously through the at least two chosen access points.

2. Method as claimed in claim 1, further comprising choosing the access points meeting said criterion in the terminal equipment.

3. Method as claimed in claim 1, further comprising choosing the access points meeting said criterion in a gateway exchange.

4. Method as claimed in claim 1, further comprising
   establishing the criterion for the choice of a transmission capacity of a data transmission of the chosen at least two access points,
   choosing the transmission capacity of each chosen access point according to a result of the evaluation, and
   proportioning the data transmission between the chosen access points in relation to the chosen transmission capacities.

5. Method as claimed in claim 1, further comprising evaluating the access points constantly.

6. Method as claimed in claim 1, further comprising evaluating the access points at certain intervals of time.

7. Method as claimed in claim 5, further comprising evaluating the access points by monitoring a quality of the data transmission.

8. Method as claimed in claim 1, further comprising giving reports to an application used in the terminal equipment on characteristics of the chosen access points.

9. Method as claimed in claim 8, further comprising adapting a functioning of the application according to the reported characteristics.

10. Method as claimed in claim 1, further comprising reporting characteristics of the chosen access points to a user.

11. Method as claimed in claim 1, further comprising establishing the criterion from an application to be used.

12. Method as claimed in claim 11, further comprising choosing at least one access point meeting said criterion for the application.

13. Method as claimed in claim 11, wherein said evaluating comprises evaluating the access points, in which the access points comprise at least one wireless access point.

14. A method of routing a data transmission connection between terminal equipment and a host over a data transmission network including at least two access points for connection of the terminal equipment to the data transmission network, the method comprising:
   establishing a criterion for a choice of a data transmission relaying capacity of the access points;
   estimating the access points in accordance with the criterion;
   choosing a relaying capacity of each access point according to results of the estimation; and
   proportioning data transmission traffic between the access points in relation to the chosen relaying capacities such that data transmission traffic is sent simultaneously through the at least two access points.

15. Method as claimed in claim 14, further comprising estimating the access points according to a criterion in the terminal equipment.

16. Method as claimed in claim 14, further comprising estimating the access points according to the criterion in a gateway exchange.

17. Method as claimed in claim 14, further comprising estimating the access points continuously.

18. Method as claimed in claim 14, further comprising estimating the access points at certain intervals.

19. Method as claimed in claim 14, further comprising estimating the access points by monitoring a quality of a data transmission.

20. Method as claimed in claim 14, further comprising reporting characteristics of the access points to an application used in the terminal equipment.

21. Method as claimed in claim 20, further comprising adapting an operation of the application in accordance with the reported characteristics.

22. Method as claimed in claim 14, further comprising reporting characteristics of the access points to a user.

23. Method as claimed in claim 14, further comprising establishing the criterion from an application to be used.

24. Method as claimed in claim 14, wherein said estimating comprises estimating the access points, in which the access points comprise at least one wireless access point.

25. An arrangement for routing a data transmission connection between terminal equipment and a host over a data transmission network, wherein the data transmission network includes at least two access points for connecting the terminal equipment to the data transmission network, the arrangement comprising:
   a router, located in the terminal equipment, configured to route a data transmission through at least two access points simultaneously.

26. Arrangement as claimed in claim 25, wherein the router is configured to route the data transmission through the at least two access points, in which at least one of the at least two access points comprises a wireless access point.

27. An arrangement for routing a data transmission connection between terminal equipment and a host over a data transmission network, wherein the data transmission network includes at least two access points for connecting the terminal equipment of the data transmission network, the arrangement comprising:
   a router, located in the terminal equipment and in a gateway exchange, configured to route a data transmission through at least two access points simultaneously.

28. Arrangement as claimed in claim 27, wherein at least one of the at least two access points comprises a wireless access point.

29. An arrangement for routing a data transmission connection between terminal equipment and a host over a data transmission network, wherein the data transmission network includes at least two access points for connecting the terminal equipment to the data transmission network, the arrangement comprising:
   a router, located in a gateway exchange, configured to route a data transmission through at least two access points simultaneously.

30. Arrangement as claimed in claim 29, wherein at least one of the at least two access points comprises a wireless access point.

31. Terminal equipment configured to:
- connect to a data transmission network through at least two access points;
- establish a criterion for a choice of an access point;
- evaluate the access points according to said criterion;
- choose at least two of said at least two access points, wherein at least two access points chosen meet said criterion; and
- connect data transmission traffic simultaneously through the at least two access points chosen in the step of choosing.

32. Terminal equipment comprising:
- connecting means for connecting to a data transmission network through at least two access points;
- criterion means for establishing a criterion for a choice of an access point;
- evaluating means for evaluating the access points according to said criterion;
- choosing means for choosing at least two of said at least two access points, wherein at least two access points chosen meet said criterion; and
- connecting means for connecting data transmission traffic simultaneously through the at least two access points chosen in the step of choosing.

* * * * *